(12) United States Patent
Yoshida et al.

(10) Patent No.: US 7,149,037 B2
(45) Date of Patent: Dec. 12, 2006

(54) ZOOM LENS SYSTEM AND IMAGE-TAKING APPARATUS HAVING THE SAME

(75) Inventors: Hirofumi Yoshida, Utsunomiya (JP); Koshi Hatakeyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 11/191,406

(22) Filed: Jul. 27, 2005

(65) Prior Publication Data

US 2006/0023318 A1  Feb. 2, 2006

(30) Foreign Application Priority Data

Jul. 30, 2004 (JP) .............. 2004-224744
Jul. 20, 2005 (JP) .............. 2005-210377

(51) Int. Cl.
 G02B 15/14  (2006.01)
 G02B 13/08  (2006.01)

(52) U.S. Cl. .................... 359/676; 359/708
(58) Field of Classification Search ........... 359/676, 359/683, 708
See application file for complete search history.

(56) References Cited

U.S. PATENT DOCUMENTS 3,305,294 A  2/1967  Alvarez .............. 351/169
3,583,790 A  6/1971  Baker .............. 350/184
4,925,281 A  5/1990  Baker .............. 350/423
6,603,608 B1 *  8/2003  Togino .............. 359/676

FOREIGN PATENT DOCUMENTS

JP  64-35964  2/1989
JP  09-005650  1/1997

OTHER PUBLICATIONS

English Abstract for Japanese Application No. 64-35964.
English Abstract for Japanese Application No. 09-005650.

* cited by examiner

Primary Examiner—Scott J. Sugarman
(74) Attorney, Agent, or Firm—Morgan & Finnegan LLP

(57) ABSTRACT

A zoom lens system includes plural optical units each of which includes plural optical elements each having a rotationally asymmetrical surface, and changes optical power as the optical elements in each of the plural optical units move in directions different from an optical axis, wherein a principal point position moves in an optical-axis direction without causing the optical element to move in the optical-axis direction, the zoom lens system having such a shape that the principal point position of at least one unit of the plural optical units is located outside the one unit.

6 Claims, 19 Drawing Sheets

TELEPHOTO END

WIDE-ANGLE END

MIDDLE

TELEPHOTO END

MIDDLE

WIDE-ANGLE END

ZOOM LENS SYSTEM AND IMAGE-TAKING APPARATUS HAVING THE SAME

BACKGROUND OF THE INVENTION

The present invention relates generally to a zoom lens system, such as an image-taking apparatus, a projection apparatus, an exposure apparatus, and a reader apparatus. The present invention is particularly suitable for a small image-taking apparatus.

Along with the recent widespread of digital cameras and camera phones, an application field of small camera is increasingly spreading. For smaller sizes of such cameras, a smaller image-pickup device is increasingly demanded. In addition, the added values are also increasingly demanded, such as zooming, wide-angle arrangement, and high-definition performances. However, it is difficult to combine the miniaturization with the highly added values in view of the zooming scheme, because zooming usually needs movements of a lens along an optical path relative to a light-receiving surface, such as a CCD, and movements in the object direction extends an overall length of the optical system, preventing the miniaturization.

Prior art include U.S. Pat. Nos. 3,305,294 and 3,583,790, and Japanese Patent Application, Publication No. 01-35964. U.S. Pat. No. 3,305,294 provides each of a pair of lenses with a curved surface expressed by a cubic function, and shifts these two lenses in a direction different from the optical-axis direction for power variations and miniaturization. This lens is referred to as a so-called Alvarez lens. The Alvarez lens does not move in the optical-axis direction, and contributes to a reduction of the overall length. U.S. Pat. No. 3,583,790 proposes a removal of an aberration by providing a curved surface with high-order term, in particular, a quitic term. Japanese Patent Application, Publication No. 01-35964 propose that at least two lenses be arranged to change the power while the image point is maintained.

When a rotationally asymmetrical lens is included, no common axis is provided unlike a normal coaxial lens. Such a non-coaxial optical system is referred to as an off-axial optical system. Where a reference axis is defined as an optical path of the light that passes the center of an image and the center of the pupil, this optical system is defined as an optical system that includes an off-axial curved surface in which a surface normal at an intersection between the reference axis and a forming surface is not located on the reference axis. The reference axis has a bent shape, and thus a calculation of the paraxial amount should use the paraxial theory that relies upon the off-axial theory instead of the paraxial theory for a coaxial system. Japanese Patent Application, Publication No. 09-5650 calculates each of paraxial values including a focal length, a front principal point, and a rear principal point using a 4×4 matrix based on the curvature of each surface and a surface separation.

In designing a zoom lens system, U.S. Pat. Nos. 3,305,294 and 3,583,790 simply mention a method of using of a pair of rotationally asymmetrical lenses to change the power and to correct the aberration, and cannot maintain the image plane constant problematically. On the other hand, Japanese Patent Application, Publication No. 01-35964 discloses a principle to change the power while maintaining the image point constant, but does not actually design a zoom lens system through aberration corrections. An attempt was made to actually design a zoom lens system in accordance with Japanese Patent Application, Publication No. 01-35964. Prior to a discussion of the designed example, a description will be given of the way of expression of a specification in the embodiments and common matters to each embodiment.

The off-axial optical system has a bent reference axis as shown in FIG. 2. In an absolute coordinate system with an origin that is set at a center of a first surface, a reference axis is defined as a path which a ray that passes the origin and the pupil center traces. A Z-axis is defined as a line that connects the center of the image center to the origin of the absolute coordinate system as the center of the first surface, where a direction from the first surface to the center of the image is set positive. The Z-axis is referred to as an optical axis. A Y-axis is defined as a line that passes the origin and forms 90° with respect to the Z-axis in accordance with a rule of a right-hand coordinate system, and an X-axis is defined as a line that passes the origin and is orthogonal to the Y-axis and Z-axis. In this application, a paraxial value is a result of the off-axial paraxial tracing. Unless otherwise specified, it is a result of the off-axial paraxial tracing and a calculation of the paraxial value. In addition, an optical system has two or more rotationally asymmetrical, aspherical surfaces each having the following shape:

$$z = C02y^2 + C20x^2 + C03y^3 + C21x^2y + C04y^4 + C22x^2y^2 + C40x^4 + C05y^5 + C23x^2y^3 + C41x^4y + C06y^6 + C24x^2y^4 + C42x^4y^2 + C60x^6 \quad \text{[EQUATION 1]}$$

Equation 1 includes only even-order terms with respect to "x," and the curved surface defined by Equation 1 is symmetrical with respect to the yz plane.

When the following condition is met, Equation 1 is symmetrical with respect to the xz plane:

$$C03 = C21 = C05 = C23 = C41 = t = 0 \quad \text{[EQUATION 2]}$$

When the following conditions are met, Equation 1 is a rotationally symmetrical shape:

$$C02 = C20 \quad \text{[EQUATION 3]}$$

$$C04 = C40 = C22/2 \quad \text{[EQUATION 4]}$$

$$C06 = C60 = C24/3 = C42/3 \quad \text{[EQUATION 5]}$$

When the above conditions are not met, Equation 1 provides a rotationally asymmetrical shape.

A description will now be given of one actual design example of a zoom lens system in accordance with Japanese Patent Application, Publication No. 01-35964. The zoom lens system includes two pairs of rotationally asymmetrical lens units, which are labeled first and second units in order from an object side. First, these units are approximated by one thin lens for paraxial calculation purposes. The following equation is met, where $\phi 1$ and $\phi 2$ are the powers of these thin lenses of the first and second units, "e" is a principal point interval, "Sk" is a back-focus, $\phi$ is the power of the entire system, and "f" is a focal length:

$$\phi = \frac{1}{f} = \phi_1 + \phi_2 - e\phi_1\phi_2 \quad \text{[EQUATION 6]}$$

The back-focus Sk satisfies the following equation from the paraxial calculation:

$$S_k = \frac{1 - e\phi_1}{\phi} \quad \text{[EQUATION 7]}$$

When the principal point interval e and back-focus Sk are determined, $\phi 1$ and $\phi 2$ are expressed as a function of the power φ of the entire system from Equations 6 and 7 or paths of power changes of the first and second units in the changes of the power of the entire system. When the principal point interval e=3 and the back-focus Sk=15, φ1 and φ2 become as follows:

$$\phi_1 = -5\varphi + \frac{1}{3}$$ [EQUATION 8]

$$\phi_2 = \frac{1}{45\varphi} - \frac{2}{5}$$ [EQUATION 9]

FIG. 3 is a graph indicative of a relationship between φ1 and φ2 and the power φ of the entire system. As the power of the entire system increases, the first unit changes from positive to negative whereas the second conversely changes from negative to positive. Here, the rotationally asymmetrical curved surface is expressed by Equation 10, and a relationship between a coefficient "a" and the power is expressed by Equation 11:

$$z = ay^3 + 3ax^2 y$$ [EQUATION 10]

$$\varphi = 12a\delta(n-1)$$ [EQUATION 11]

x, y and z denote above axes. δ is an offset amount in the Y-axis direction from the Z-axis of the two rotationally asymmetrical lenses, and n is a refractive index of the lens. Table 1 indicates coefficient "a" and "n" of the rotationally asymmetrical lens, and the offset amounts δ from the Z-axis at a telephoto end, a midpoint, and a wide-angle end. Table 2 indicates a type of each surface and a surface separation.

TABLE 1 a: 4.0000E-03 n: 1.51742
OFFSET AMOUNT δ

|  | E1 | E2 | E3 | E4 |
|---|---|---|---|---|
| TELEPHOTO END | 3.00 mm | −3.00 mm | −1.18 mm | 1.18 mm |
| MIDDLE | 0.29 mm | −0.29 mm | 2.18 mm | −2.18 mm |
| WIDE-ANGLE END | −1.65 mm | 1.65 mm | 3.89 mm | −3.89 mm |

TABLE 2

| | TYPE OF SURFACE | SURFACE SEPARATION |
|---|---|---|
| OBJECT SURFACE | | INFINITY |
| s0 REFERENCE SURFACE | | 0 |
| S1 | PLANE | 1 |
| S2 | POLYNOMIAL SURFACE | 0.5 |
| S3 | POLYNOMIAL SURFACE | 1 |
| S4 | PLANE | 0.4 |
| s5 STOP SURFACE | | 0.4 |
| S6 | PLANE | 1 |
| S7 | POLYNOMIAL SURFACE | 0.5 |
| S8 | POLYNOMIAL SURFACE | 1 |
| S9 | PLANE | |

A zoom lens is designed based on these values. FIG. 4 shows it. A ray incident upon a reference surface S0 enters a unit G1 first. The unit G1 includes two lenses E1 and E2, and surface numbers are labeled S1 to S4. The lenses E1 and E2 decenter in the Y-axis direction, and their decentering amounts continuously change. These amounts have the same absolute value and a positive and negative relationship. This configuration changes the power of G1 as shown in FIG. 2 from positive to negative. The light that exits from G1 passes a stop S5 and enters G2. Like G1, G2 includes two lenses E3 and E4, and surface numbers are labeled S6 to S9. The lenses E3 and E4 decenter in the Y-axis direction, and their decentering amounts continuously change. These amounts have the same absolute value and a positive and negative relationship. This configuration changes the power of G2 as shown in FIG. 2 from negative to positive.

The light that passes these lenses images without changing the image plane. However, a variable range of the focal length of the entire system is about 14 mm to 21 mm, providing a zooming ratio of about 1.5 times.

When the offset amount is increased so as to increase the zooming ratio, an offset between the upper and lower rays on the on-axial light becomes large, each unit has larger power, and it becomes difficult to maintain the aberration low.

BRIEF SUMMARY OF THE INVENTION

The present invention is directed to a zoom lens system that increases the zooming ratio while maintaining the aberrational low, and an image-taking apparatus having the same.

A zoom lens system according to one aspect of the present invention includes plural optical units each of which includes plural optical elements each having a rotationally asymmetrical surface, and changes optical power as the optical elements in each of the plural optical units move in directions different from an optical axis, wherein a principal point position moves in an optical-axis direction without causing the optical element to move in the optical-axis direction, the zoom lens system having such a shape that the principal point position of at least one unit of the plural optical units is located outside the one unit.

Other objects and further features of the present invention will become readily apparent from the following description of the embodiments with reference to accompanying drawings.

DETAILED DESCRIPTION OF THE PREFERRED EMBODIMENTS

Figure 3:
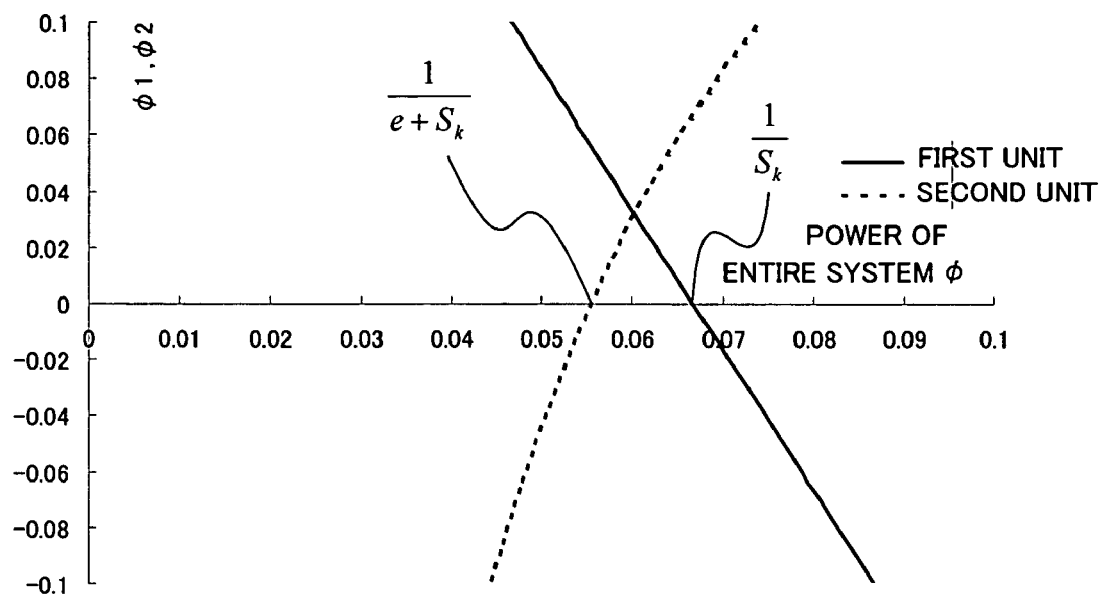
FIG. 3 is a view showing a power arrangement of lenses designed based on a prior art example.
Figure 4:
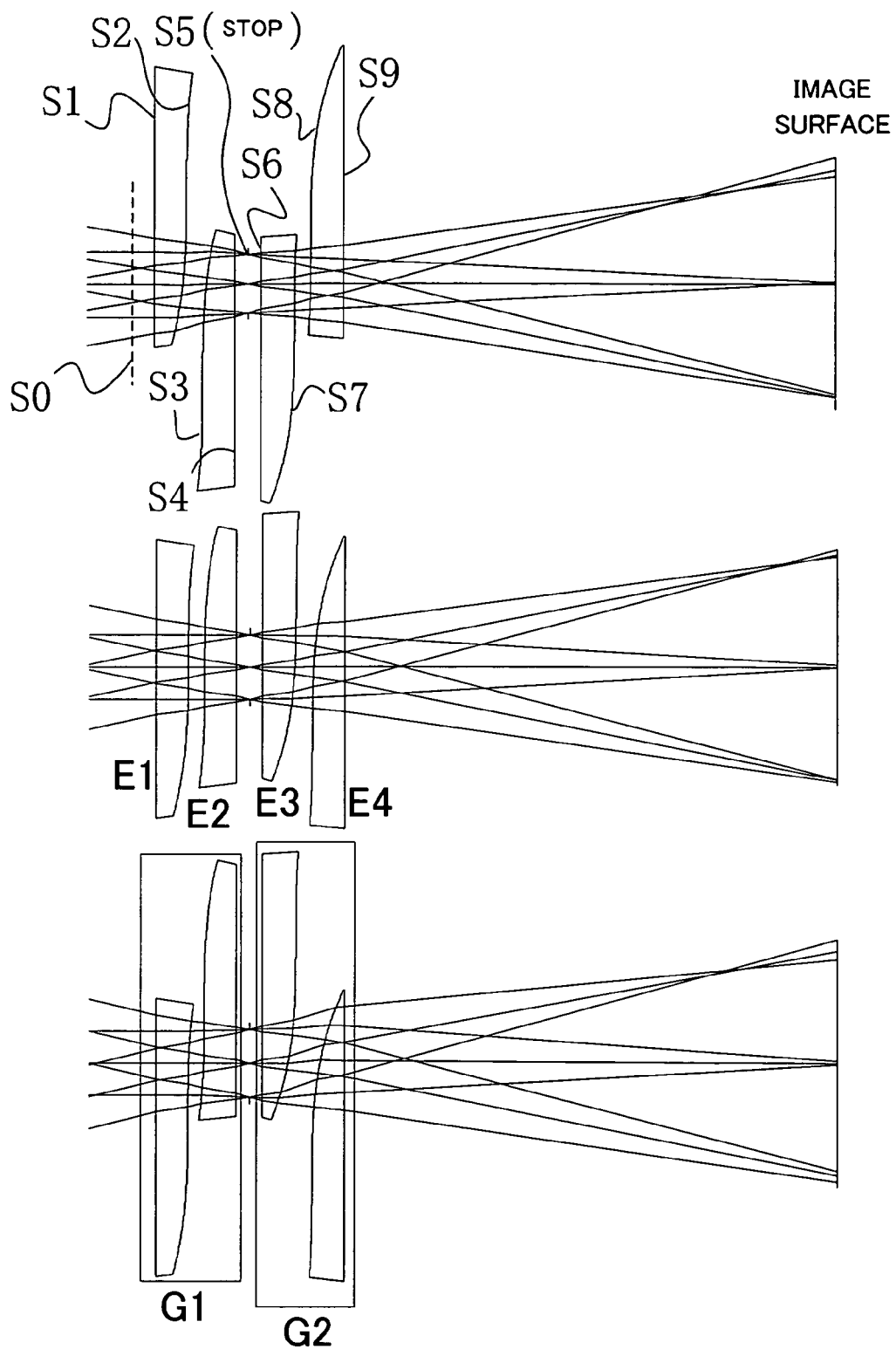
FIG. 4 is a sectional view of the lenses designed based on the prior art example.

The prior art example calculates Equations 6 to 9, and power changes of each unit relative to the focal length as shown in FIG. 3. As the power of each unit is increased, the aberration occurs. Therefore, in order to increase the zooming ratio without increasing the power of each unit, it is effective to reduce an inclination of the power changes of each unit relative to the power of the entire system. In order to implement this scheme, a discussion turns back to the paraxial arrangement that uses the thin lens approximation. The following equations are led from Equations 6 and 7 while $S_k$ and principal point interval e are used as variable. Each of paraxial values of the focal length, the front and back principal point position is defined as a value led by Japanese Patent Application, Publication No. 09-5650. These values are led by calculating a 4×4 matrix based on the curvature of each surface and each surface separation.

$$\phi_1 = \frac{-S_k}{e}\phi + \frac{1}{e} \quad \text{[EQUATION 12]}$$

$$\phi_2 = \frac{-1}{eS_k}\frac{1}{\phi} + \frac{e+S_k}{eS_k} \quad \text{[EQUATION 13]}$$

It is understood from these equations that both inclinations depend upon e and Sk. Accordingly, the following equations are obtained by differentiating both of them by $\phi$:

$$\frac{d\phi_1}{d\phi} = \frac{-S_k}{e} \quad \text{[EQUATION 14]}$$

$$\frac{d\phi_2}{d\phi} = \frac{1}{eS_k\phi^2} \quad \text{[EQUATION 15]}$$

$\phi_1$ linearly changes and the inclination is constant, whereas $\phi_2$ changes depending upon the power $\phi$ of the entire power. As the principal point interval e increases, both of $\phi_1$ and $\phi_2$ have small inclinations, providing high magnifications. As $S_k$ increases, $\phi_1$ increases whereas $\phi_2$ decreases. Therefore, a $S_k$'s changing direction that provides the high magnification cannot be determined.

Here, inclinations of $\phi_1$ and $\phi_2$ to the power $\phi$ of the entire system are compared with each other. Equation 17 is established when it satisfies Equation 16 where $\phi_1$=0:

$$\phi = \frac{1}{S_k} \quad \text{[EQUATION 16]}$$

$$\left|\frac{d\phi_1}{d\phi}\right| = \left|\frac{d\phi_2}{d\phi}\right| = \frac{S_k}{e} \quad \text{[EQUATION 17]}$$

Equation 19 is met within a range where Equation 18 is satisfied. Equation 21 is met within a range where Equation 20 is satisfied.

$$\phi < \frac{1}{S_k} \quad \text{[EQUATION 18]}$$

$$\left|\frac{d\phi_1}{d\phi}\right| < \left|\frac{d\phi_2}{d\phi}\right| \quad \text{[EQUATION 19]}$$

$$\phi > \frac{1}{S_k} \quad \text{[EQUATION 20]}$$

$$\left|\frac{d\phi_1}{d\phi}\right| > \left|\frac{d\phi_2}{d\phi}\right| \quad \text{[EQUATION 21]}$$

Table 3 compares these values:

TABLE 3

| $\phi$ | ... | $\frac{1}{e+S_k}$ | ... | $\frac{1}{S_k}$ | ... |
|---|---|---|---|---|---|
| $\left|\frac{d\phi_1}{d\phi}\right|$ | SMALL | SMALL | SMALL | EQUAL | LARGE |
| $\left|\frac{d\phi_2}{d\phi}\right|$ | LARGE | LARGE | LARGE | EQUAL | SMALL |

As discussed, it is understood that Equation 19 is established in a broad range. Therefore, the high magnification is obtainable when the inclination of $\phi_2$, which has a large inclination in a broad range, can be made smaller. Accordingly, when the inclination of $\phi_2$ is addressed in Equation 15, it is understood that the inclination can be made small when the principal point interval e and the back-focus $S_k$ can be made larger. Since a distance between the principal point position in the first unit and the image plane (or an overall length in the thin lens approximation), which is a sum of the principal point interval and the back-focus is constant, the inclination of $\phi_2$ becomes minimum when e=$S_k$ and the zooming ratio becomes maximum. With a conversion from the thin lens approximation to the thick lens, the principal point interval "e" is converted into a distance between H1' and H2 offsets from the principal point interval of the thin lens. Therefore, the following equation is effective, where $e_0$ is a distance between an object point and H1, e is a distance between H1' and H2, $e_i$ is a distance between H2' and an image point, and e' is a smaller one of $e_0$ and $e_i$:

$$0.7 < \frac{e}{e'} < 1.4 \quad \text{[EQUATION 22]}$$

Equation 22 means that e is substantially equal to e' and allows an error about 0.3.

The high magnification is also obtained if the back-focus $S_k$ is constant and the principal point is movable, because both of the inclinations of $\phi_1$ and $\phi_2$ can be made smaller as the principal point interval "e" is increased. A higher magnification is also obtained when a lens that expands a principal point interval through a surface shape of an optical element in the unit is used for a rotationally asymmetrical lens, and the principal point interval is enlarged, while the surface separation is maintained.

Figure 5:
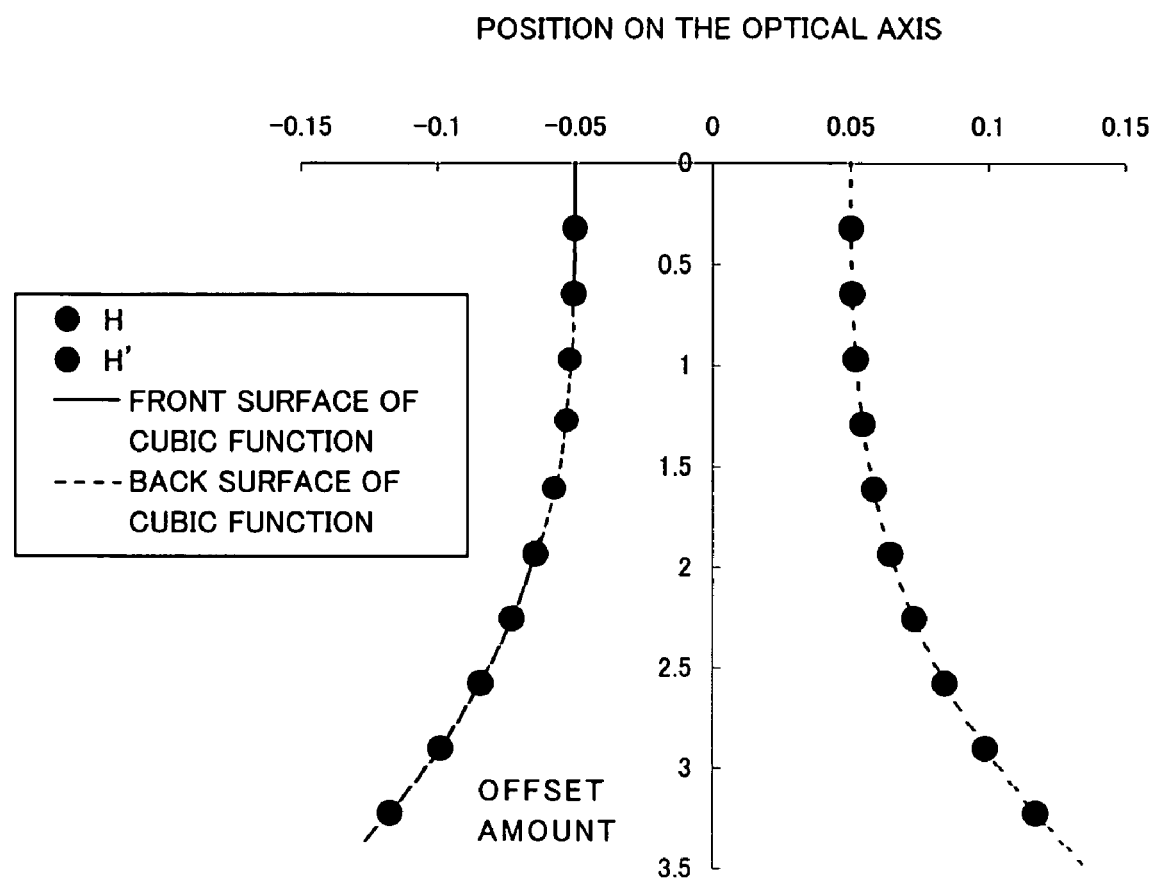
FIG. 5 shows movements of principal points according to the embodiment shown in FIG. 1.

When a curved surface specified by Equation 10 is used for only one surface, the front and back principal points move on that surface as shown in FIG. 5. Use of this optical element alone does not greatly move the principal point position or increase the zooming ratio. The high magnification is obtained without increasing the surface separation if this principal point moves before or after the lens, increasing the principal point interval.

A discussion will now be given of the principal point positions of three types of lenses, i.e., a biconvex lens, a biconcave lens and a meniscus lens. Each of the biconvex and biconcave lenses has a principal point inside the lens, and it is unlikely that the principal point is greatly moved to the outside of the lens. On the other hand, the meniscus lens is a lens that can arrange the principal point outside the lens, different from the biconvex and biconcave lenses. Therefore, when this shape is used for the rotationally asymmetrical lens, the principal point can be greatly moved to the outside of the lens. When this shape is used for the rotationally asymmetrical lens as in this optical system, it is expected to increase the principal point interval and achieve the high magnification.

As understood from Equation 6, a higher magnification is available when the principal point interval is made small at the telephoto end and larger at the wide-angle end. Where $\phi_w$ is the power of the entire system at the wide-angle side, $\phi_{1w}$ and $\phi_{2w}$ are powers of the first and second units, $e_w$ is the principal point interval, $\phi_t$ is the power of the entire system at the telephoto side, $\phi_{1t}$ and $\phi_{2t}$ are powers of the first and second units, and $e_t$ is the principal point interval, Equation 6 is modified as follows:

$$\phi_w = \phi_{1w} + \phi_{2w} - e_w \phi_{1w} \phi_{2w} \quad [\text{EQUATION 23}]$$

$$\phi_t = \phi_{1t} + \phi_{2t} - e_t \phi_{1t} \phi_{2t} \quad [\text{EQUATION 24}]$$

Here, $\phi_w > \phi_t$ is met. Since $\phi_1$ and $\phi_2$ have different signs, the following equation is prescribed:

$$\phi_{1w} + \phi_{2w} > 0 \quad [\text{EQUATION 25}]$$

$$\phi_{1t} + \phi_{2t} < 0 \quad [\text{EQUATION 26}]$$

Understandably, Equation 27 provides high magnification because a difference between $\phi w$ and $\phi t$ is large:

$$e_w > e_t \quad [\text{EQUATION 27}]$$

In summary, the following three requirements are necessary for high magnification:
1) The principal point interval is about half the overall length.
2) The rotationally asymmetrical lens has a meniscus shape so as to increase the principal point interval.
3) The principal point interval at the telephoto end is made smaller than that at the wide-angle end.

First Embodiment

A description will be given of the specification according to the embodiment of the present invention. An image-taking surface assumes a CCD with a size of ¼ inch, i.e., longitudinally 2.7 mm×laterally 3.6 mm. The incident pupil diameter is set to 0.8.

Figure 6:
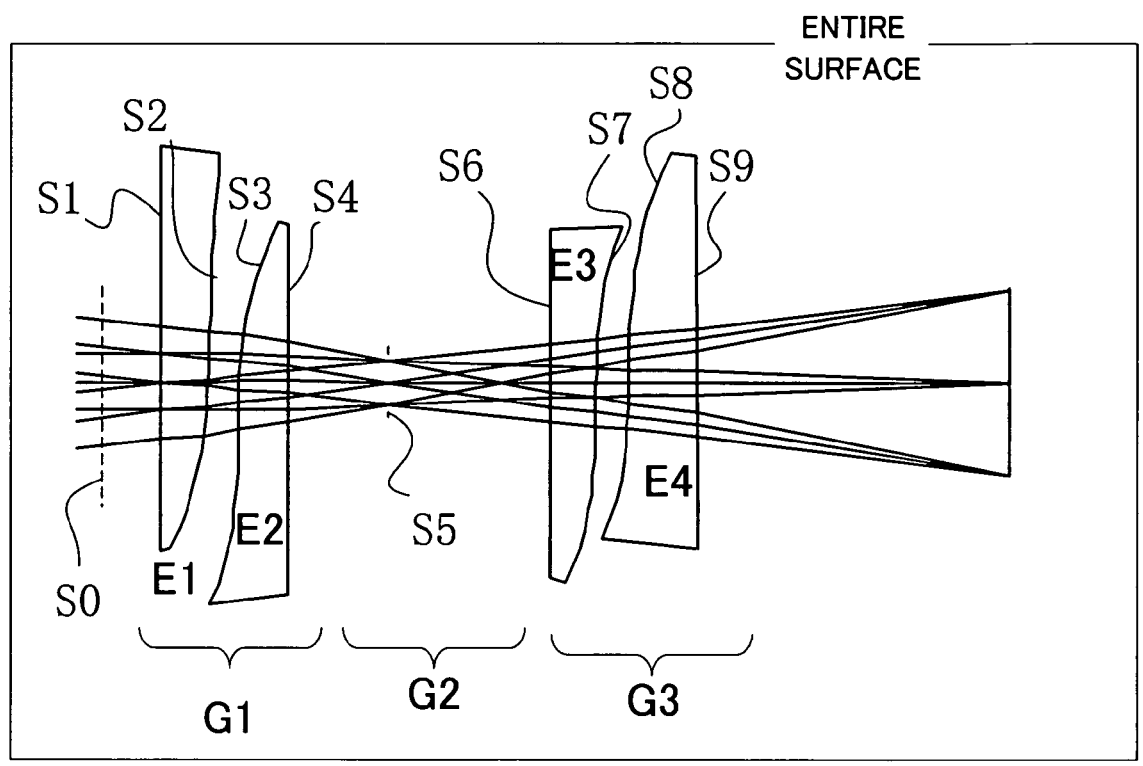
FIG. 6 is a sectional view of the lenses according to the embodiment shown in FIG. 1.

FIG. 6 shows an optical-path diagram of the first embodiment. Totally four lenses are included, and E1, E2, E3 and E4 from the object side (or the front) are rotationally asymmetrical lenses. These lenses decenter in the Y-axis direction and their decentering amounts continuously change. These amounts have, but are not limited to, the same absolute value and a positive and negative relationship. The lenses E1 and E2 constitute a first unit, which is labeled G1.

Similarly, the lenses E3 and E4 constitute a second unit, which is labeled G2. A reference surface S0 is set as the origin of the absolute coordinate system for the surface number, and a first surface of E1 is labeled S1. S2, S3, and S4 are labeled sequentially, and the stop after S4 (or E2) is referred to as S5. A first surface of E3 is labeled S6, the following surfaces are sequentially numbered, and the image plane is labeled S10. In addition, the rotational asymmetrical lenses E1 to E4 that continuously decenter in the Y-axis direction are referred to as a decentering movable block.

Figure 7:
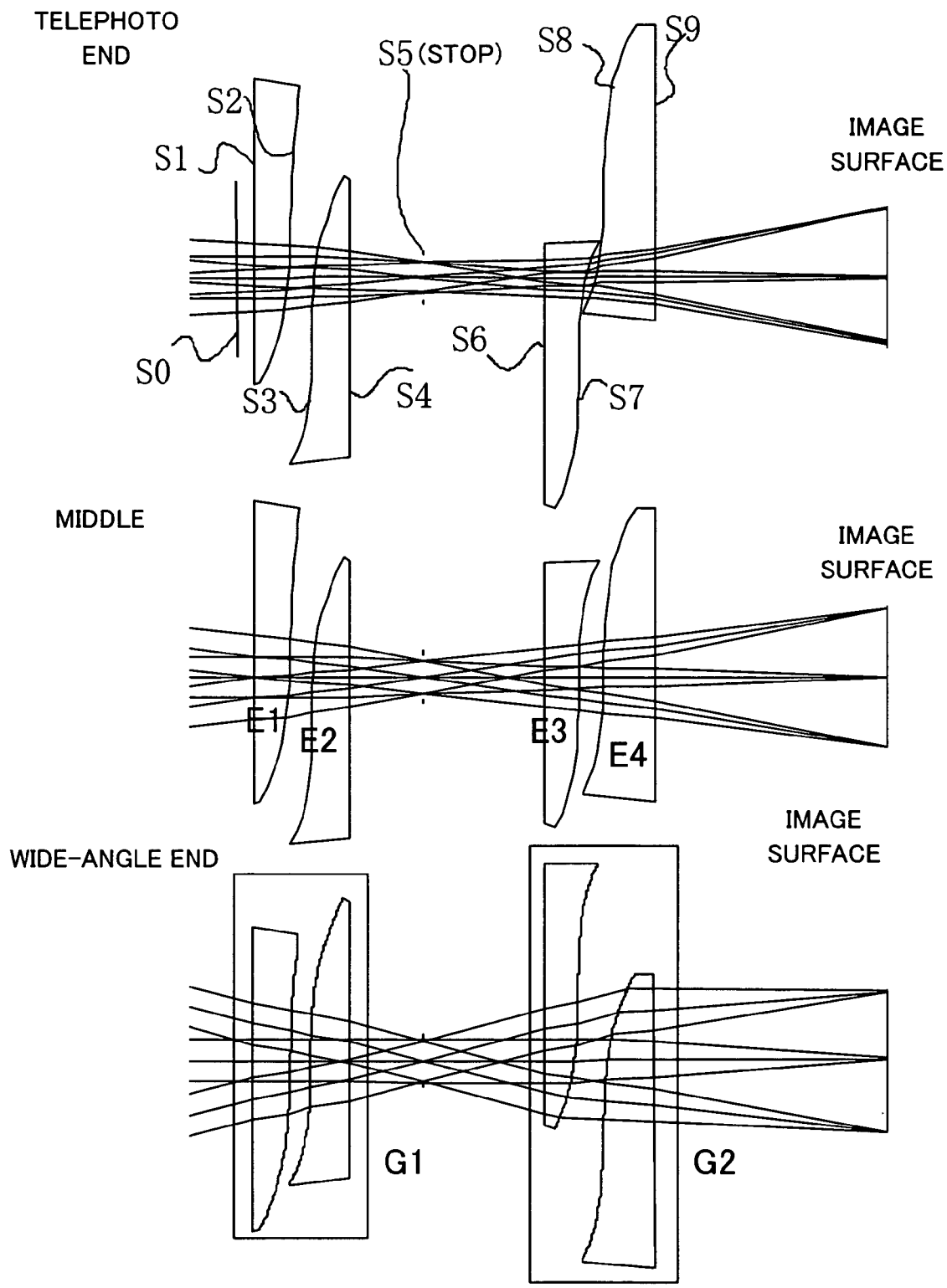
FIG. 7 shows sections of the lenses at a telephoto end, a midpoint and a wide-angle end according to the embodiment shown in FIG. 1.

Table 4 shows lens data. Table 4 shows an offset amount from the Z-axis from each lens. Table 5 shows a coefficient of the rotationally symmetrical aspheric surface expressed by Equation 12. Table 6 shows a value of each coefficient on the polynomial surface expressed by Equation 1. FIG. 7 shows optical-path diagrams at the telephoto end, the midpoint, and wide-angle end. The lenses E1 and E2 decenter in the Y-axis direction, and the decentering amounts have the same absolute value with a negative and positive relationship as shown in Table 5. This configuration changes the power of G1 from positive to negative. The light that exits from G1 passes the stop, and enters E3 and E4. The lenses E3 and E4 decenter in the Y-axis direction, and the decentering amounts have the same absolute value with a negative and positive relationship as shown in Table 5. This configuration changes the power of G2 from negative to positive.

TABLE 4

| | TYPE OF SURFACE | SURFACE SEPARATION | REFRACTIVE INDEX | ABBE NUMBER |
|---|---|---|---|---|
| OBJECT SURFACE | INFINITY | | | |
| S0 REFERENCE SURFACE | | 0 | | |
| s0 | | | | |
| s1 | PLANE | 0.7 | 1.527277 | 66.4918 |
| s2 | POLYNOMIAL SURFACE | 0.4 | | |
| s3 | POLYNOMIAL SURFACE | 0.7 | 1.519354 | 67.1899 |
| s4 | PLANE | 1.4 | | |
| STOP SURFACE s5 | | 2.3 | | |
| s6 | PLANE | 0.7 | 1.566904 | 63.4698 |
| s7 | POLYNOMIAL SURFACE | 0.5 | | |
| s8 | POLYNOMIAL SURFACE | 0.9 | 1.573768 | 63.0139 |
| s9 | PLANE | 4.4 | | |
| IMAGE PLANE | | | | |

TABLE 5

| LENS NUMBER | OFFSET AMOUNT | | |
|---|---|---|---|
| | TELEPHOTO END | MIDDLE | WIDE-ANGLE END |
| E1 | 1.06214 | 0.68122 | −0.13833 |
| E2 | −1.06214 | −0.68122 | 0.13833 |
| E3 | −1.70461 | −0.1551 | 1.42971 |
| E4 | 1.70461 | 0.1551 | −1.42971 |

TABLE 6

| | | | | | |
|---|---|---|---|---|---|
| S3 | C2: | −8.56E−03 | C3: | 1.89E−02 | C4: | 2.79E−04 |
| | C5: | −8.42E−04 | C6: | −1.94E−04 | C20: | −2.11E−02 |
| | C21: | 6.78E−02 | C22: | 4.80E−03 | C23: | −2.64E−03 |
| | C24: | −5.55E−04 | C40: | 1.44E−02 | C41: | −2.98E−03 |
| | C42: | −3.14E−04 | C60: | −5.15E−03 | | |
| S4 | C2: | 3.94E−03 | C3: | 2.46E−02 | C4: | −1.25E−04 |
| | C5: | 5.76E−05 | C6: | −1.94E−04 | C20: | −3.26E−02 |
| | C21: | 7.77E−04 | C22: | 3.57E−03 | C23: | −7.63E−03 |
| | C24: | 2.73E−03 | C40: | 1.93E−02 | C41: | −2.02E−03 |
| | C42: | −3.45E−04 | C60: | −9.78E−03 | | |
| S8 | C2: | 1.68E−03 | C3: | 1.90E−02 | C4: | −1.35E−04 |
| | C5: | 5.96E−04 | C6: | 1.57E−02 | C20: | −2.07E−01 |
| | C21: | 5.25E−02 | C22: | 4.90E−03 | C23: | 3.91E−03 |
| | C24: | 8.18E−04 | C40: | 2.84E−02 | C41: | 7.73E−03 |
| | C42: | 1.62E−03 | C60: | −1.37E−03 | | |
| S9 | C2: | 6.94E−03 | C3: | 1.78E−02 | C4: | −5.86E−04 |
| | C5: | 5.08E−04 | C6: | −8.62E−05 | C20: | −2.26E−01 |
| | C21: | 6.53E−02 | C22: | −6.94E−03 | C23: | 3.83E−03 |
| | C24: | −1.05E−03 | C40: | 3.54E−02 | C41: | −3.88E−03 |
| | C42: | 7.78E−04 | C60: | −3.05E−03 | | |

Figure 8A:
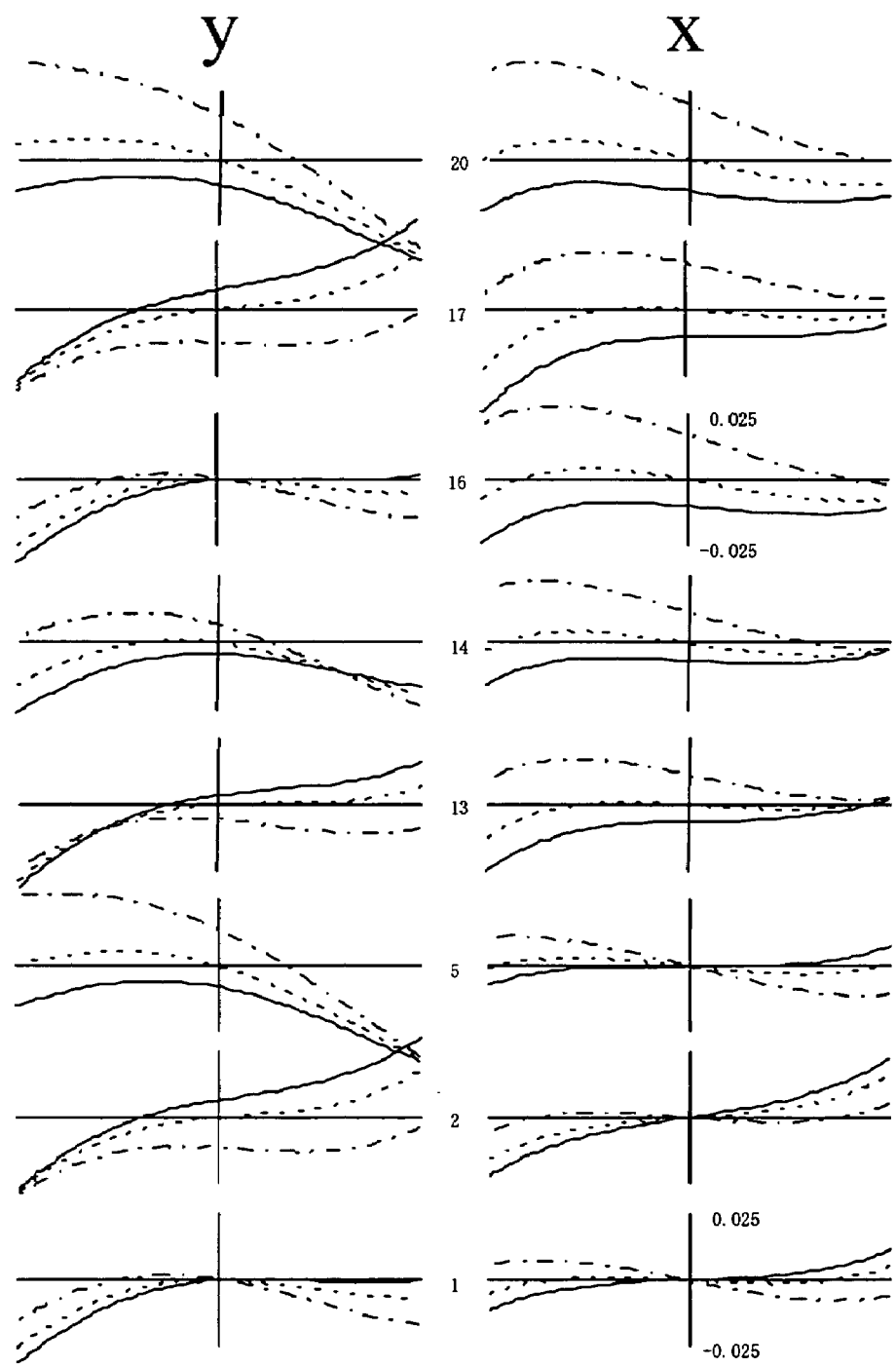
FIGS. 8A–8C are aberrational views according to the embodiment shown in FIG. 1.
Figure 8B:
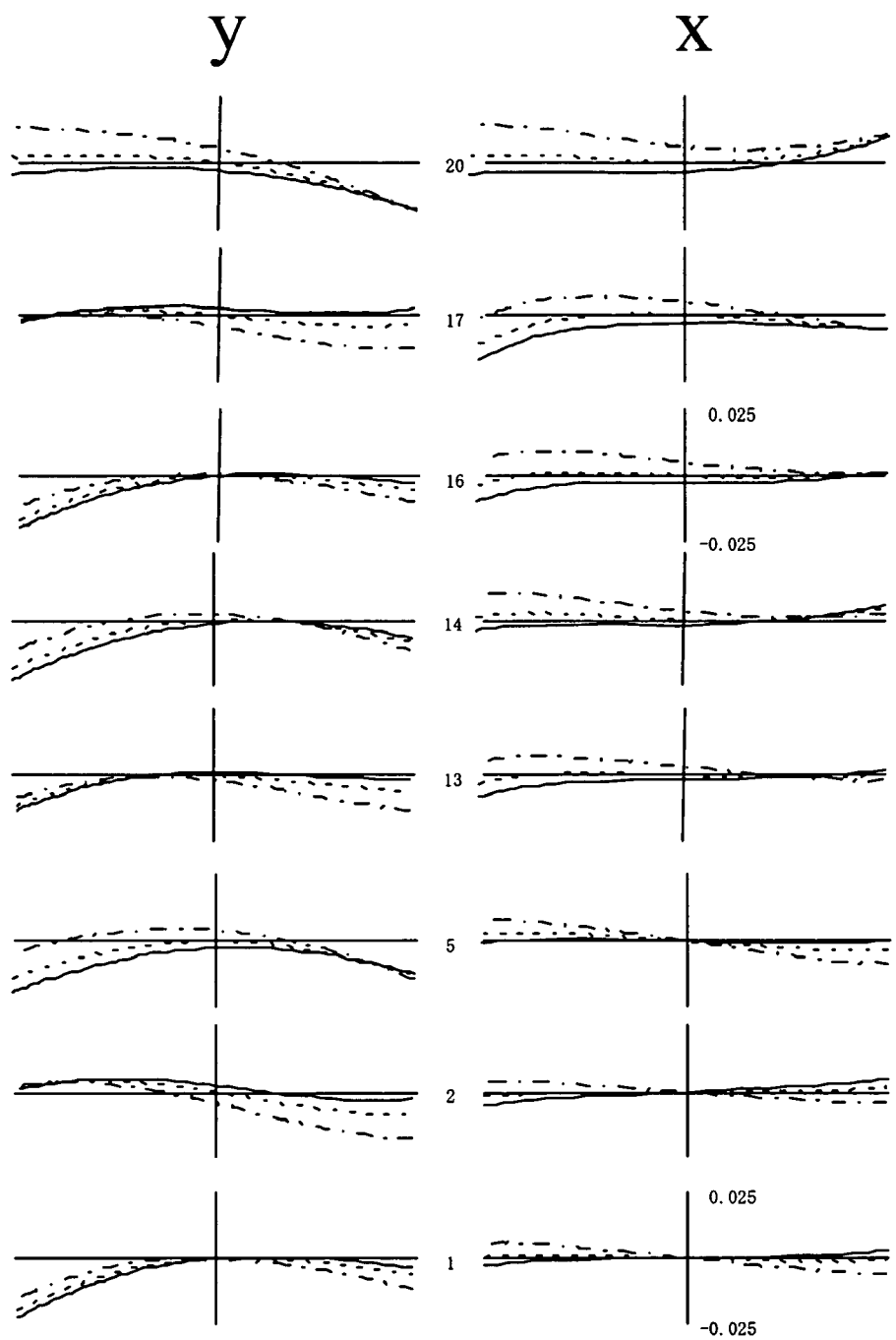
Figure 8C:
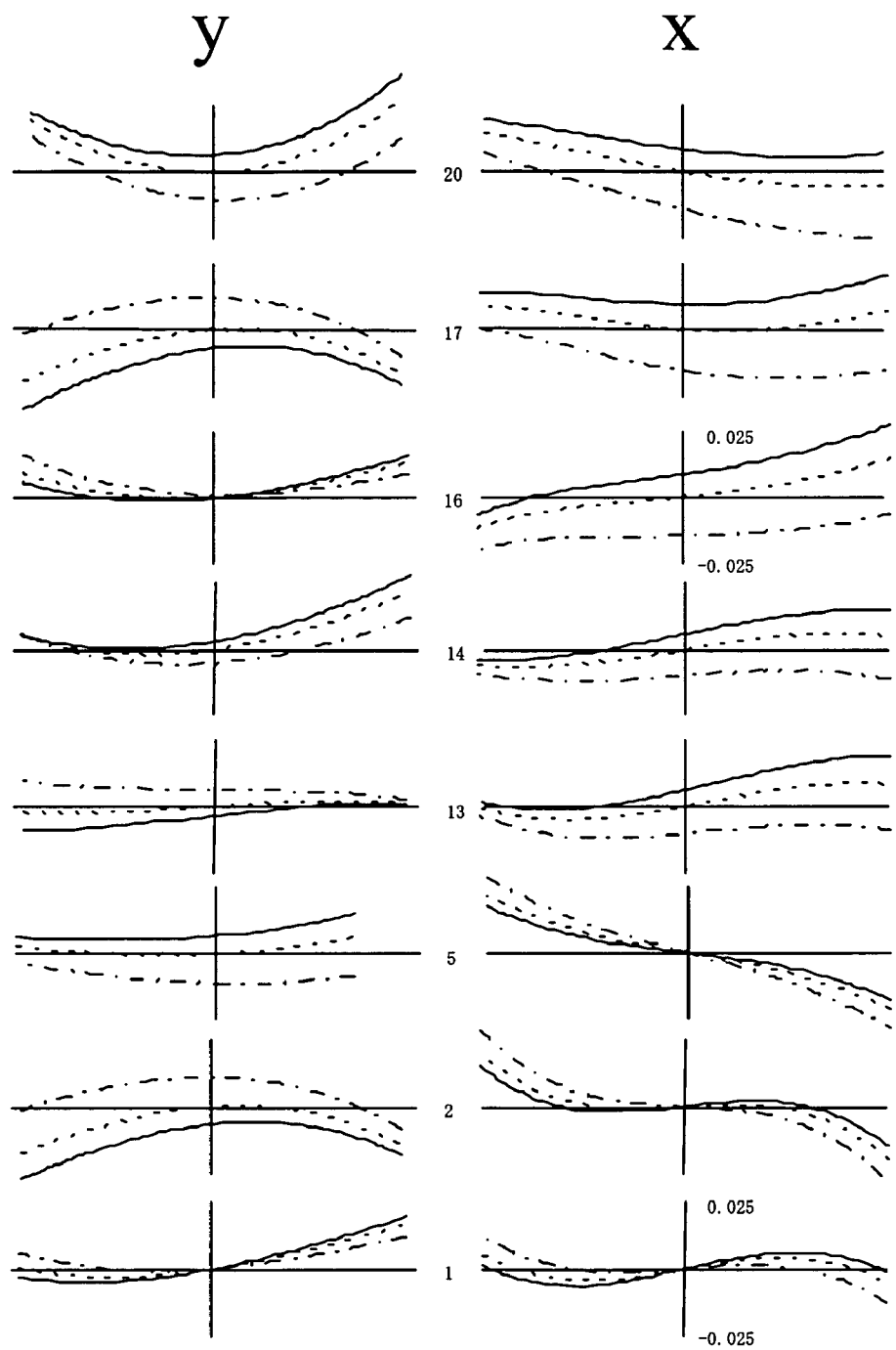
Figure 9:
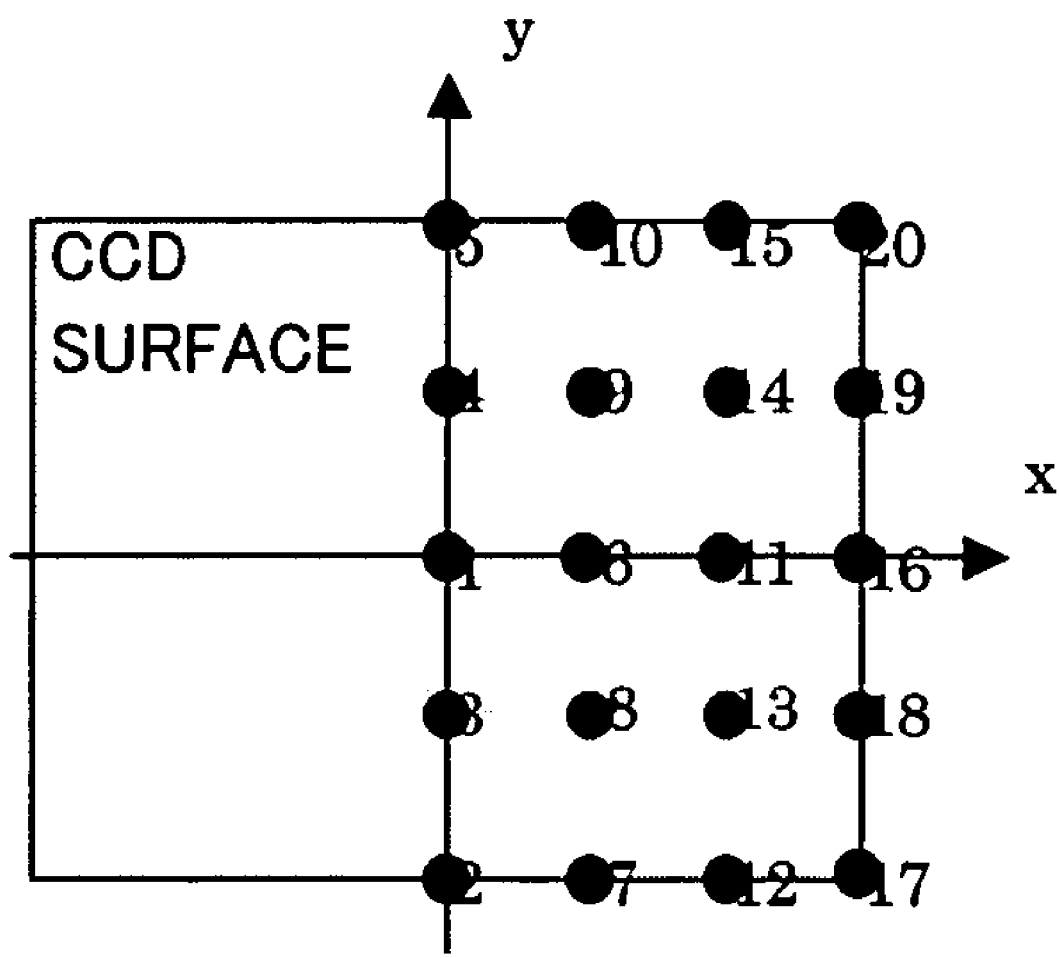
FIG. 9 is a view showing numbered rays on the image plane according to the embodiment shown in FIG. 1.
Figure 10:
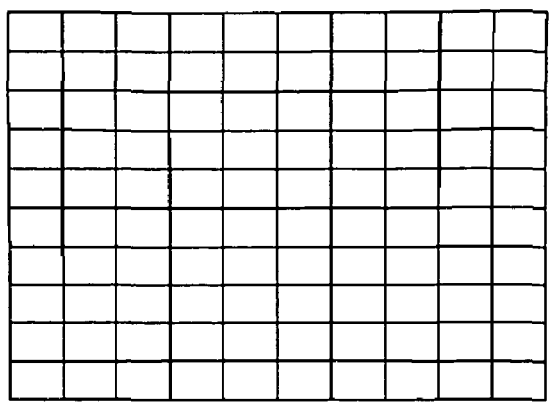
FIG. 10 shows distortion grids at a telephoto end, a midpoint and a wide-angle end.
Figure 10:
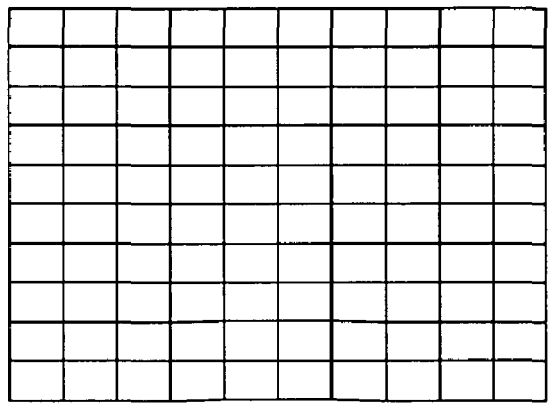
Figure 10:
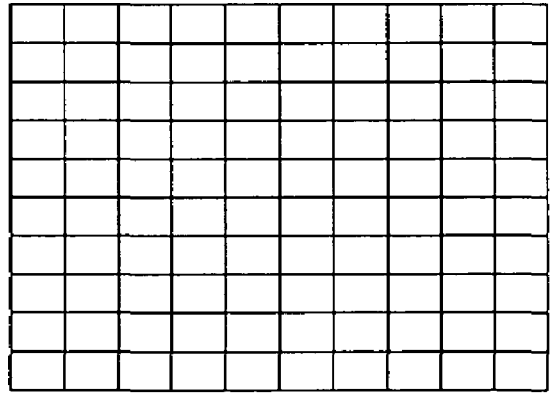

FIGS. 8A to 8C show aberrational diagrams at the telephoto end (where the optical power of the entire system becomes minimum), the midpoint, and the wide-angle end (where the optical power of the entire system becomes maximum), where the abscissa axis denotes a position of the light on the pupil, and the ordinate axis denotes an offset of the image plane from the principal ray. The ordinate axis ranges between ±20 μm. The number in FIGS. 8A to 8C denote an angle-of-field number, and is as shown in FIG. 9 on the image plane. Since it is symmetrical on the X-axis, only the positive in the X direction will be considered. It is understood that a ray at the angle of view of 0° sufficiently eliminates the coma from the telephoto end to the wide-angle end. In addition, FIG. 10 shows distortion grids each having a ¼ inch (longitudinally 2.7 mm×laterally 3.6 mm). It is understood from FIG. 9 that the distortion sufficiently reduces.

This embodiment achieves a zooming ratio of 4 times relating to a focal length from 5 mm to 20 mm. In comparison with the prior art example where the zooming ratio is 1.5 times, this embodiment provides such a high magnification of 4 times by making the principal point interval e between G1 and G2 about half a distance between G1 and the image plane. The principal point position of each unit is located at the center of the unit throughout a range from the telephoto end to the wide-angle end. A higher magnification by increasing the principal point interval while the positions of G1 and G2 are maintained is obtained by using a meniscus shape for the rotationally asymmetrical lens, as in the following embodiment.

Second Embodiment

Figure 11:
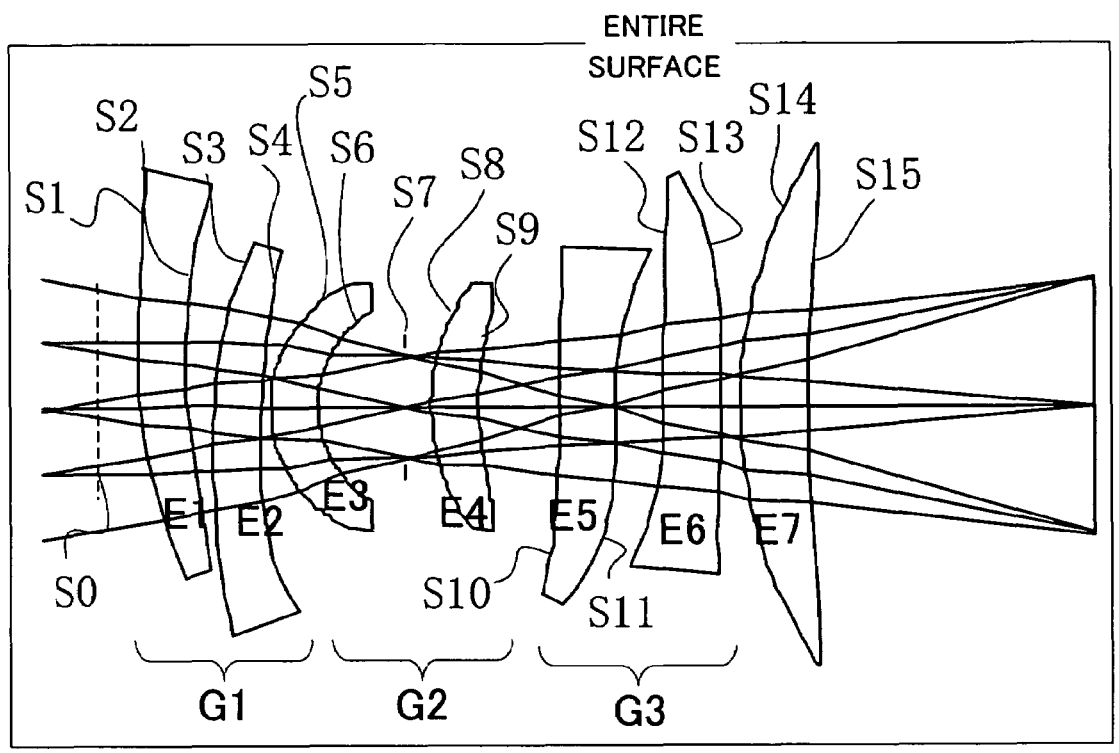
FIG. 11 is a sectional view of the lenses according to a second embodiment of the present invention.

The second embodiment uses the same specification as that of the first embodiment, but sets the incident pupil diameters of 1.88, 1.40 and 0.75 at the telephoto end, midpoint and wide-angle end, respectively, so that the F-numbers at the telephoto end, midpoint and wide-angle end are 8, 5.6 and 4. FIG. 11 shows an optical-path diagram. A description will be given of the specification according to the embodiment of the present invention. Totally seven lenses are used, and E1, E2, E5 and E6 from the object side (or the front) are rotationally asymmetrical lenses. These lenses decenter in the Y-axis direction and their decentering amounts continuously change. These amounts have the same absolute value and a positive and negative relationship. E3, E4 and E7 are rotationally symmetrical, aspheric lenses, but may be rotationally asymmetrical lenses so as to eliminate any remaining aberrations that are asymmetrical with respect to the optical axis. The lenses E1 and E2 constitute a first unit, which is labeled G1. Similarly, the lenses E3 and E4 constitute a second unit, which is labeled G2. The lenses E5 and E6 constitute a third unit, which is labeled G3. A reference surface S0 is set as the origin of the absolute coordinate system for the surface number, and a first surface of E1 is labeled S1. S2, S3, and S4 are labeled sequentially, and the stop after S6 (or E3) is referred to as S7. A first surface of E4 is labeled S8, the following surfaces are sequentially numbered, and the image plane is labeled S16. In addition, the rotational asymmetrical lenses (G1 and G3) that continuously decenter in the Y-axis direction are referred to as decentering movable block, whereas the rotational symmetrical lenses (G2 and E7) that continuously decenter in the Y-axis direction are referred to as auxiliary block. The auxiliary block helps the aberrational correction, which would be otherwise difficult only with the decentering movable block.

Table 7 shows lens data. Table 8 shows an offset amount from the Z-axis from each lens. Table 9 shows a value of each coefficient on the polynomial surface expressed by Equation 1.

TABLE 7

| | TYPE OF SURFACE | RADIUS OF CURVATURE | SURFACE SEPARATION | REFRACTIVE INDEX | ABBE NUMBER |
|---|---|---|---|---|---|
| OBJECT SURFACE | | | | | |
| s0 REFERENCE SURFACE S0 | | | 0 | | |
| s1 | POLYNOMIAL SURFACE | | 0.5 | | 65.5527 |
| s2 | POLYNOMIAL SURFACE | | 0.3 | | |
| s3 | POLYNOMIAL SURFACE | | 0.5 | 1.589647 | 62.0231 |
| s4 | POLYNOMIAL SURFACE | | 0.1 | | |
| s6 | SPHERICAL | 0.712795 | 0.5 | 1.48749 | 70.4058 |
| s7 STOP SURFACE s8 | SPHERICAL | 0.853974 | 0.929661 0.251098 | | |
| s9 | SPHERICAL | 0.452264 | 0.5 | 1.48749 | 70.4058 |

TABLE 7-continued

| | TYPE OF SURFACE | RADIUS OF CURVATURE | SURFACE SEPARATION | REFRACTIVE INDEX | ABBE NUMBER |
|---|---|---|---|---|---|
| s10 | SPHERICAL | 0.246629 | 0.819241 | | |
| s11 | POLYNOMIAL SURFACE | | 0.6 | 1.62041 | 60.3236 |
| s12 | POLYNOMIAL SURFACE | | 0.5 | | |
| s13 | POLYNOMIAL SURFACE | | 0.6 | 1.62041 | 60.3236 |
| s14 | POLYNOMIAL SURFACE | | 0.2 | | |
| s15 | SPHERICAL | 0.19521 | 0.7 | 1.48749 | 70.4058 |
| s16 | SPHERICAL | 0.05331 | 3 | | |
| IMAGE SURFACE | | | | | |

TABLE 8

| LENS NUMBER | OFFSET AMOUNT | | |
|---|---|---|---|
| | TELEPHOTO END | MIDDLE | WIDE-ANGLE END |
| E1 | 0.89952 | 0.49385 | −0.60408 |
| E2 | −0.89952 | −0.49385 | 0.60408 |
| E5 | −1.22297 | −0.29356 | 0.58002 |
| E6 | 1.22297 | 0.29356 | −0.58002 |

TABLE 9

| S2 | C2: | 7.25E−02 | C3: | −2.17E−02 | C4: | −6.26E−03 |
|---|---|---|---|---|---|---|
| | C5: | 1.22E−03 | C6 | 5.61E−04 | C20: | 1.44E−01 |
| | C21: | −4.85E−02 | C22: | −1.05E−02 | C23: | −1.59E−03 |
| | C24: | 1.95E−03 | C40: | 2.90E−04 | C41: | 1.37E−03 |
| | C42: | 2.20E−03 | C60: | −4.96E−04 | | |
| S3 | C2: | 8.88E−02 | C3 | 4.58E−04 | C4: | −6.74E−03 |
| | C5: | 1.68E−03 | C6: | 6.93E−04 | C20: | 1.41E−01 |
| | C21: | 1.98E−02 | C22: | −1.06E−02 | C23: | −1.32E−03 |
| | C24: | 1.47E−03 | C40: | 1.08E−02 | C41: | 6.24E−03 |
| | C42: | 2.97E−03 | C60: | −7.26E−04 | | |
| S4 | C2 | 4.49E−02 | C3: | 5.69E−03 | C4: | 6.07E−03 |
| | C5: | 2.35E−04 | C6: | −4.21E−05 | C20: | 1.02E−01 |
| | C21: | −2.38E−02 | C22: | 4.02E−02 | C23: | 2.44E−03 |
| | C24: | −4.75E−03 | C40: | 2.87E−02 | C41: | −3.42E−03 |
| | C42: | −7.96E−03 | C60: | −1.15E−03 | | |
| S5 | C2: | 6.12E−02 | C3: | −2.26E−02 | C4: | 1.06E−02 |
| | C5: | −1.41E−03 | C6: | 5.87E−05 | C20: | 1.71E−01 |
| | C21: | −1.38E−01 | C22: | 7.36E−02 | C23: | −1.47E−02 |
| | C24: | −2.46E−03 | C40: | 3.38E−02 | C41: | −2.19E−02 |
| | C42: | −4.05E−03 | C60: | −1.28E−03 | | |
| S11 | C2: | −2.00E−02 | C3: | 2.91E−02 | C4: | 6.76E−03 |
| | C5: | −2.34E−03 | C6: | −2.23E−03 | C20: | 1.19E−02 |
| | C21: | 8.79E−03 | C22: | 6.91E−03 | C23: | −1.83E−02 |
| | C24: | −1.06E−02 | C40: | 2.13E−02 | C41: | −2.43E−02 |
| | C42: | −2.76E−02 | C60: | −6.62E−03 | | |
| S12 | C2: | −4.15E−02 | C3: | 7.74E−02 | C4: | 8.72E−03 |
| | C5: | −1.55E−03 | C6: | −2.17E−03 | C20: | −1.00E−01 |
| | C21: | 1.58E−01 | C22: | 2.16E−02 | C23: | −1.26E−02 |
| | C24: | −9.10E−03 | C40: | 6.61E−03 | C41: | −2.38E−02 |
| | C42: | −1.94E−02 | C60: | −1.42E−03 | | |
| S13 | C2: | −5.49E−03 | C3: | 3.23E−02 | C4: | −1.21E−02 |
| | C5: | −1.63E−03 | C6: | 9.65E−04 | C20: | −1.61E−01 |
| | C21: | 8.58E−02 | C22: | 1.15E−02 | C23: | −3.03E−03 |
| | C24: | −1.78E−04 | C40: | −2.17E−04 | C41: | 2.42E−03 |
| | C42: | −2.40E−03 | C60: | −2.36E−03 | | |
| S14 | C2: | −2.64E−02 | C3: | −1.02E−02 | C4: | −7.90E−03 |
| | C5: | −2.20E−03 | C6: | 7.70E−04 | C20: | −1.11E−01 |
| | C21: | −4.63E−02 | C22: | 1.04E−02 | C23: | −3.82E−03 |
| | C24: | −1.01E−04 | C40: | 1.27E−02 | C41: | −2.64E−03 |
| | C42: | 4.33E−04 | C60: | −9.88E−05 | | |

Figure 12:
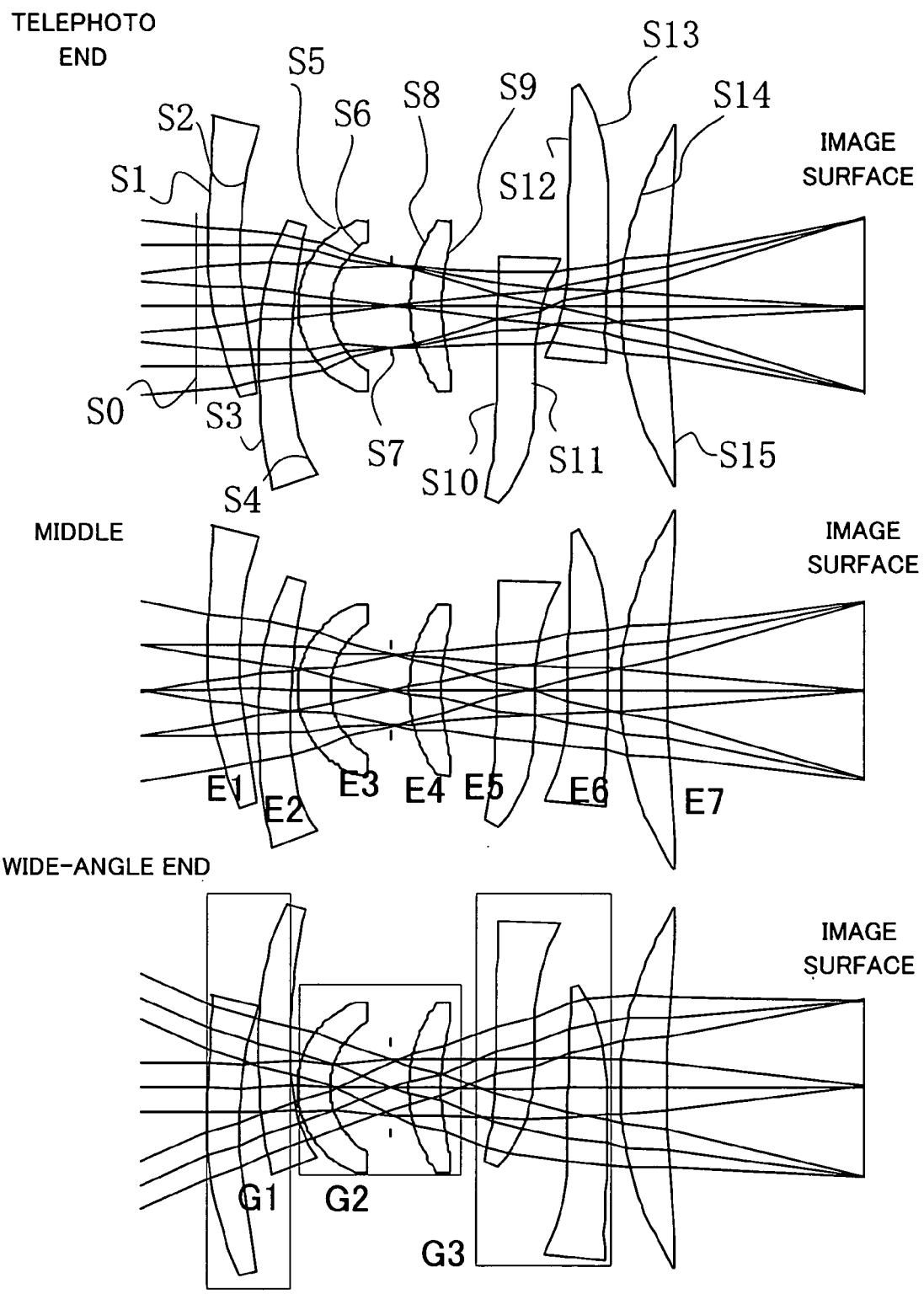
FIG. 12 shows sections of the lenses at a telephoto end, a midpoint and a wide-angle end according to the embodiment shown in FIG. 11.

FIG. 12 shows optical-path diagrams at the telephoto end, the midpoint, and wide-angle end. The lenses E1 and E2 decenter in the Y-axis direction, and the decentering amounts have the same absolute value with a negative and positive relationship as shown in Table 8. This configuration changes the power of G1 from positive to negative. The light that exits from G1 passes E3, the stop S7 and E4, and enters E5 and E6. The lenses E5 and E6 decenter in the Y-axis direction, and the decentering amounts have the same absolute value with a negative and positive relationship as shown in Table 8. This configuration changes the power of G2 from negative to positive. The light that passes the decentering movable block enters the next auxiliary block. The auxiliary block supplements the insufficient power of the decentering movable block. The light that passes these lenses images without changing the image plane.

Figure 13A:
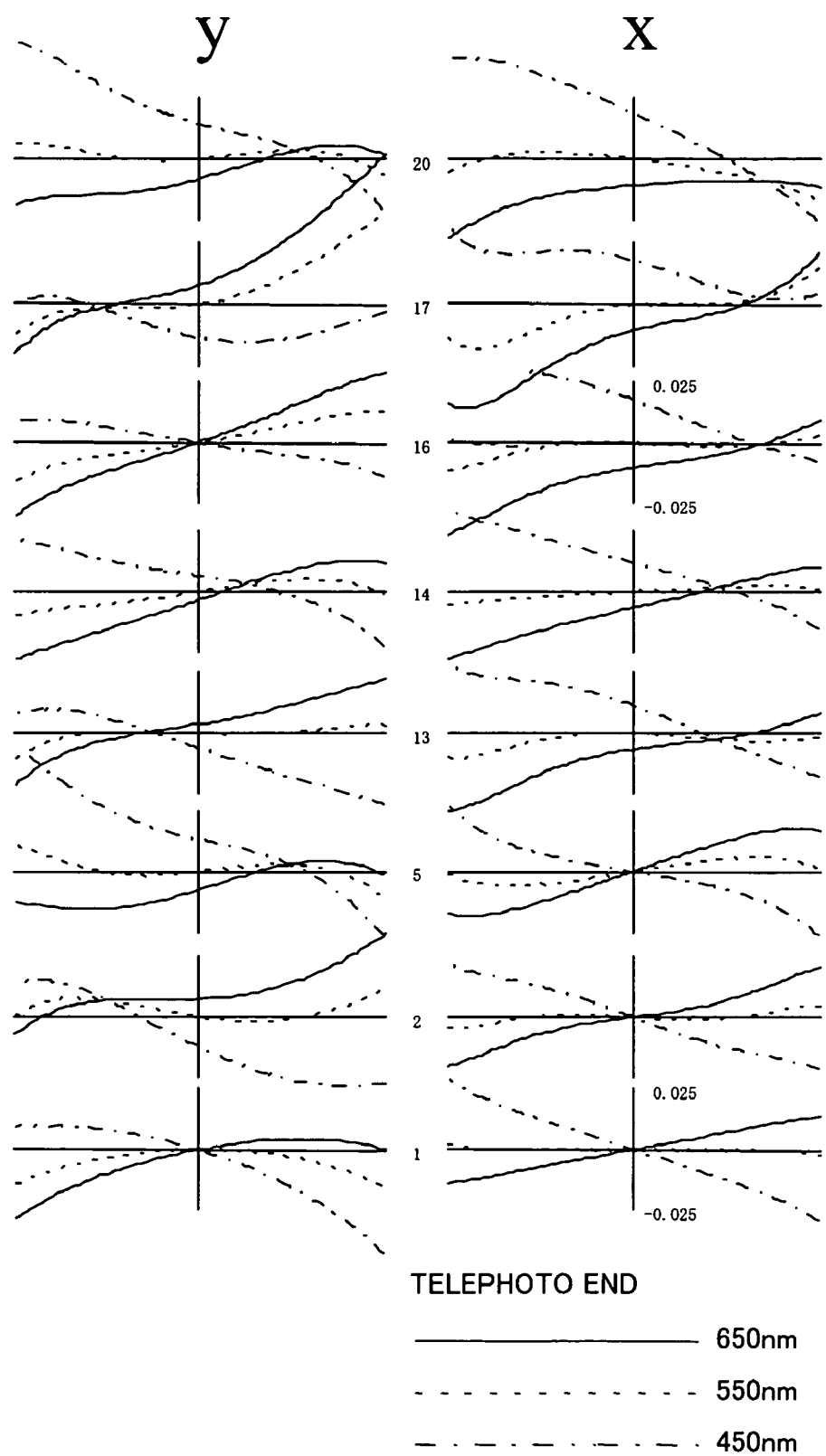
FIGS. 13A–13C are aberrational views according to the embodiment shown in FIG. 1.
Figure 13B:
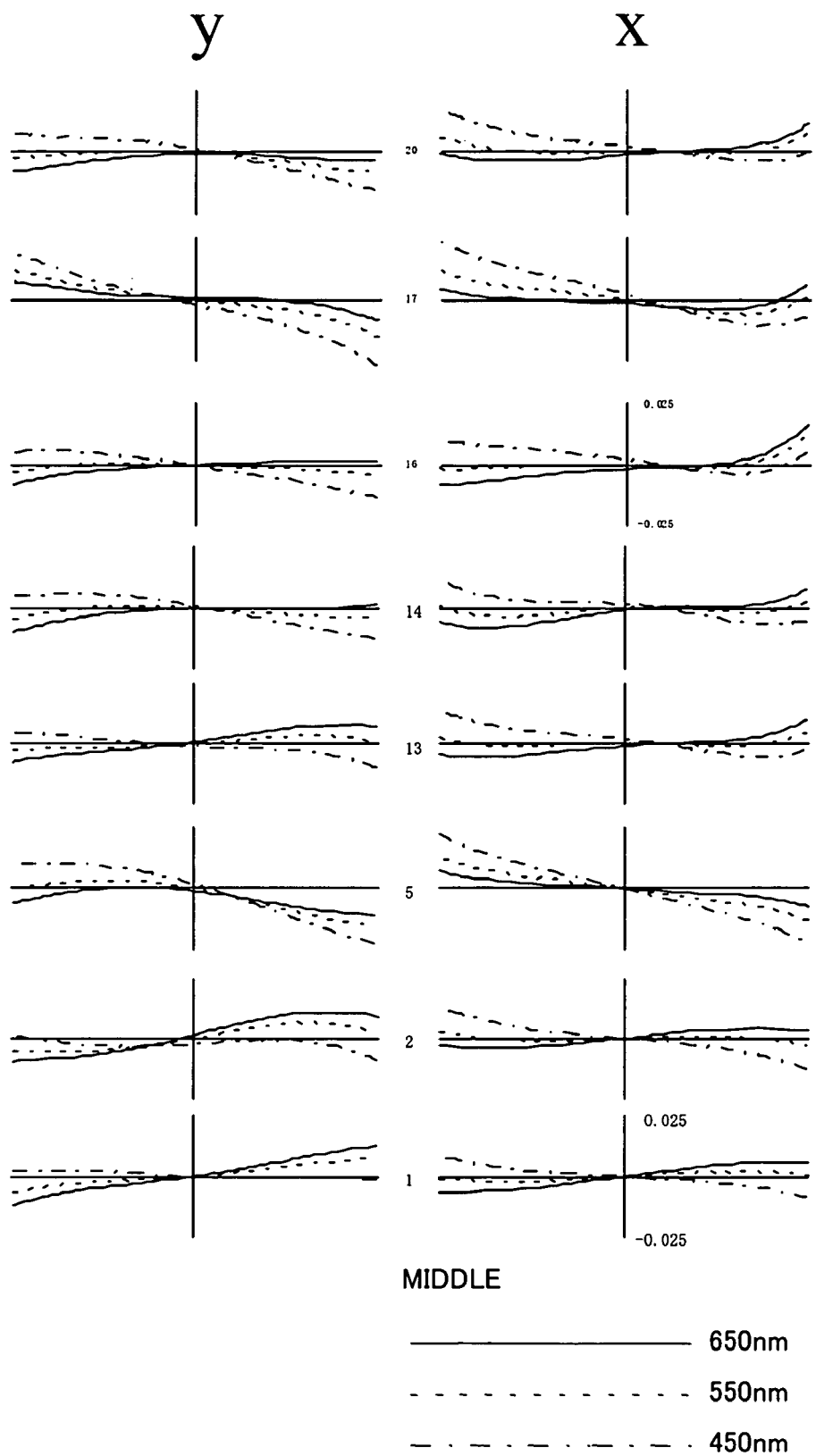
Figure 13C:
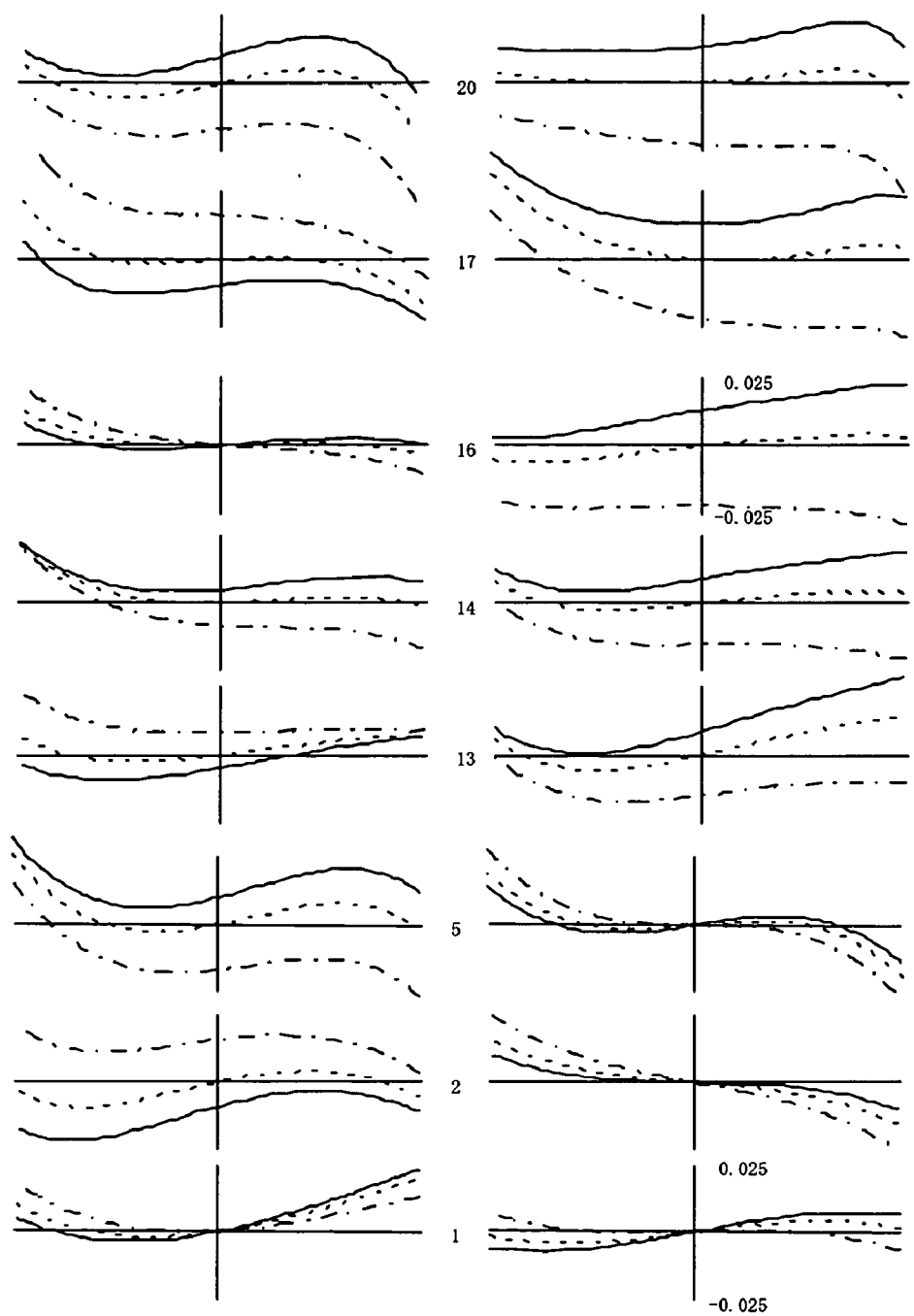
Figure 14:
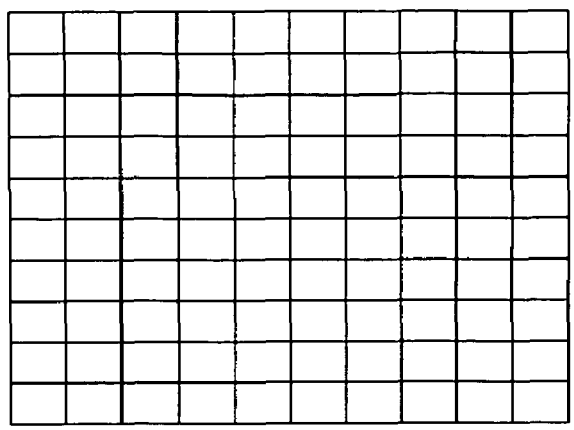
FIG. 14 shows distortion grids at a telephoto end, a midpoint and a wide-angle end.
Figure 14:
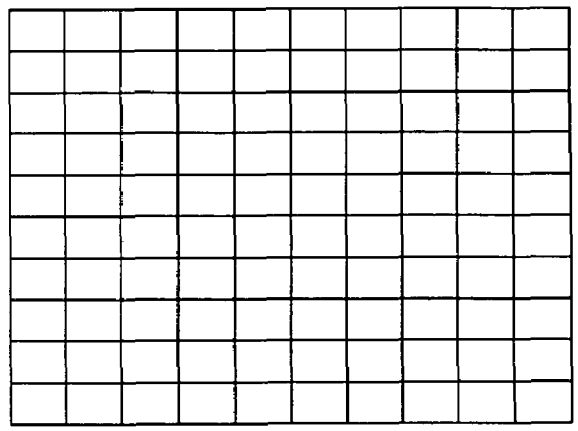
Figure 14:
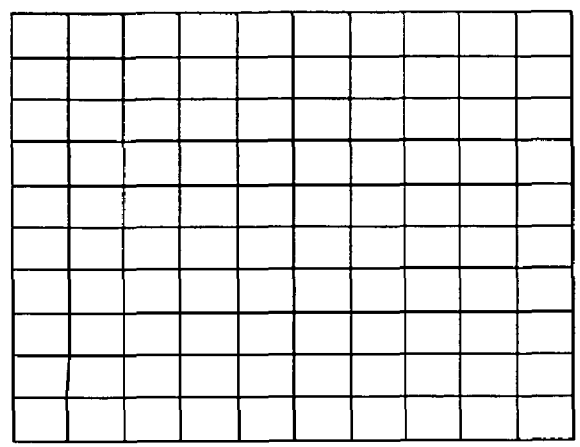

FIGS. 13A to 13C show aberrational diagrams at the telephoto end, the midpoint, and the wide-angle end, where the abscissa axis denotes a position of the light on the pupil, and the ordinate axis denotes an offset of the image plane from the principal ray. The ordinate axis ranges between ±20 µm. The number in FIGS. 13A to 13C denote an angle-of-field number, and is as shown in FIG. 9 on the image plane. Since it is symmetrical on the X-axis, only the positive in the X direction will be considered. It is understood that a ray at the angle of view of 0° sufficiently eliminates the coma from the telephoto end to the wide-angle end. In addition, FIG. 14 shows distortion grids each having a ¼ inch (longitudinally 2.7 mm×laterally 3.6 mm). It is understood from FIG. 9 that the distortion sufficiently reduces.

Figure 1:
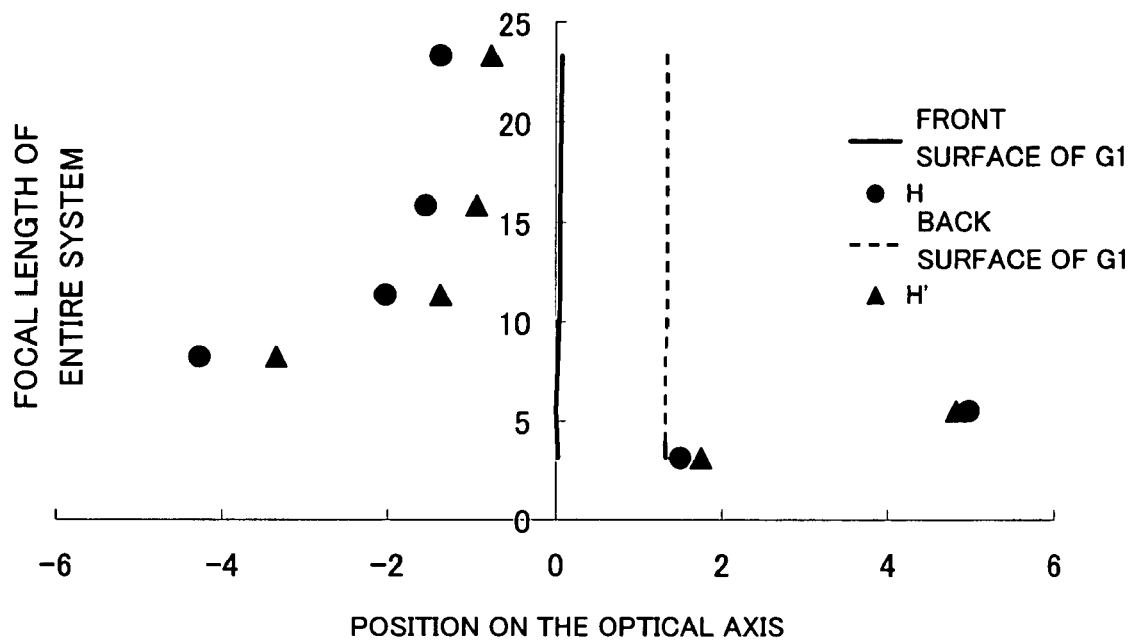
FIG. 1 shows movements of principal points in a zoom lens system according to a first embodiment of the present invention.
Figure 1:
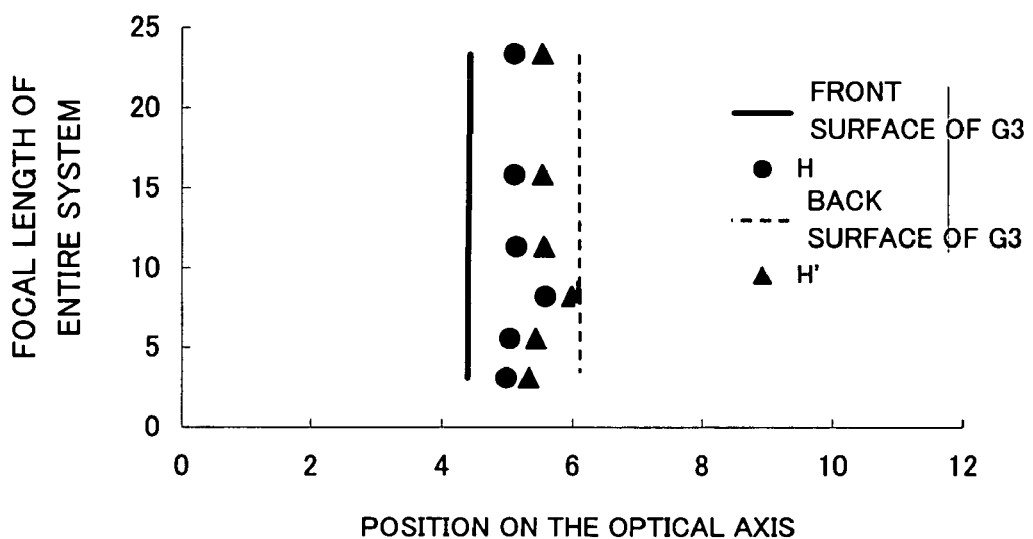
Figure 2:
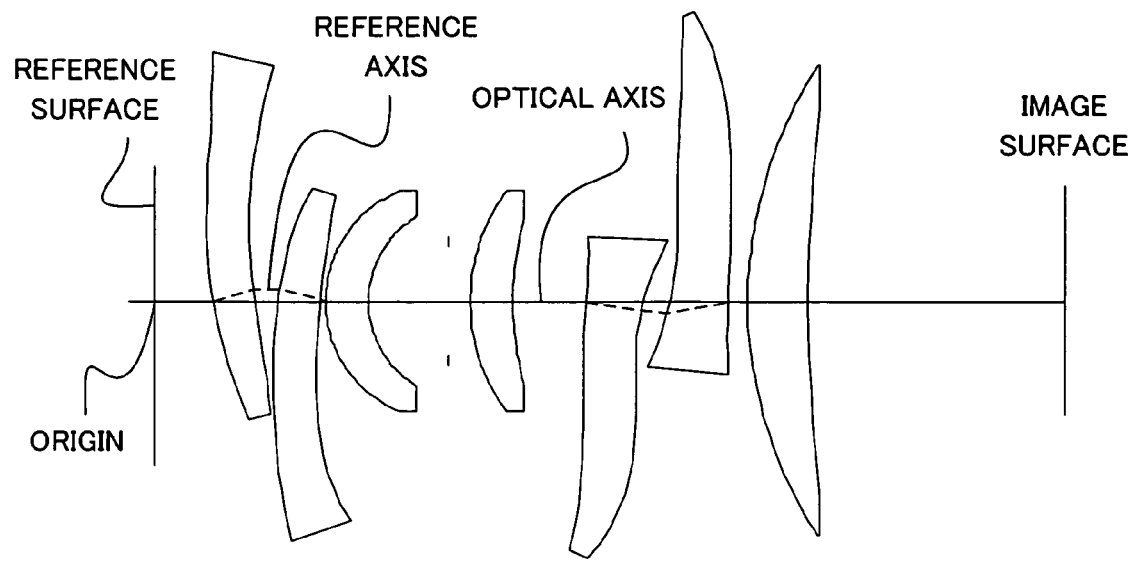
FIG. 2 is a view for explaining a conventional off-axial optical system.

This embodiment achieves a zooming ratio of about 5 times relating to a focal length from 3 mm to 15 mm. FIG. 1 shows changes of the principal point position with respect to G1 and G3. Since G1 is made of a meniscus lens, the principal point position greatly changes. In comparison with the first embodiment, this embodiment provides such a high magnification of 5 times by enlarging the surface separation and moving the principal point. As the power of the entire system increases, the change moves to the object direction and enlarges an interval between H1 and H2 within a range where the G1's power is positive. In addition, it is understood that as the power of the entire system increases the change also moves to the object direction and enlarges the interval between H1 and H2 within a range where G1's power is negative. Where H1 and H1' are G1's front and back principal point positions respectively, H2 and H2' are G2's front and back principal point positions respectively, $e_o$ is a distance between an object point and H1, e is a distance between H1' and H2, $e_i$ is a distance between H2' and an image point, and e' is a smaller one of $e_o$ and $e_i$, Table 10 shows a relationship among e, e' and e/e'.

TABLE 10

|  | e | e' | e/e' |
|---|---|---|---|
| TELEPHOTO END | 5.881797 | 4.46621 | 1.316955 |
| MIDDLE | 18.93021 | 4.00938 | 2.227329 |
| WIDE-ANGLE END | 3.23374 | 4.67458 | 0.691771 |

It is understood from Table 10 that e/e' is 1.32 at the telephoto end and equal to or greater than 0.7 and equal to or smaller than 1.4. Moreover, Table 11 shows a relationship among parameters where H1' is a G1's back principal point position, H2 is a G2's front principal point position, $e_{t1}$ is a distance between H1' and H2 when G1 has a positive power and an entire system has a minimum power, $e_{w1}$ is a distance between H1' and H2 when G1 has a positive power and an entire system has a maximum power, $e_{t2}$ is a distance between H1' and H2 when G1 has a negative power and an entire system has a minimum power, $e_{w2}$ is a distance between H1' and H2 when G1 has a negative power and an entire system has a maximum power.

TABLE 11

| POWER | G1 | | | | G2 | |
|---|---|---|---|---|---|---|
| OF G1 | H1 | H1' | e' | | H2 | H2' |
| POSITIVE | −1.36875 | −0.78529 | 5.881797 | $e_{t1}$ | 5.09651 | 5.53379 |
| POSITIVE | −1.56504 | −0.96115 | 6.058745 | | 5.0976 | 5.53592 |
| POSITIVE | −2.04017 | −1.38304 | 6.51161 | | 5.12857 | 5.55917 |
| POSITIVE | −4.2621 | −3.34968 | 8.93021 | $e_{w1}$ | 5.58053 | 5.99062 |
| NEGATIVE | 4.96657 | 4.81286 | 0.22052 | $e_{t2}$ | 5.03338 | 5.43103 |
| NEGATIVE | 1.5077 | 1.74656 | 3.23374 | $e_{w2}$ | 4.9803 | 5.32542 |

It is understood from Table 11 that $e_{t1}<e_{w1}$ and $e_{t2}<e_{w2}$ are met. From the above, the first embodiment hardly moves the principal point and achieves a zooming ratio of 4 times despite the overall length of 12 mm, whereas the second embodiment moves the principal point and achieves a zooming ratio of 5 times despite the overall length of 10 mm.

Third Embodiment

Figure 15:
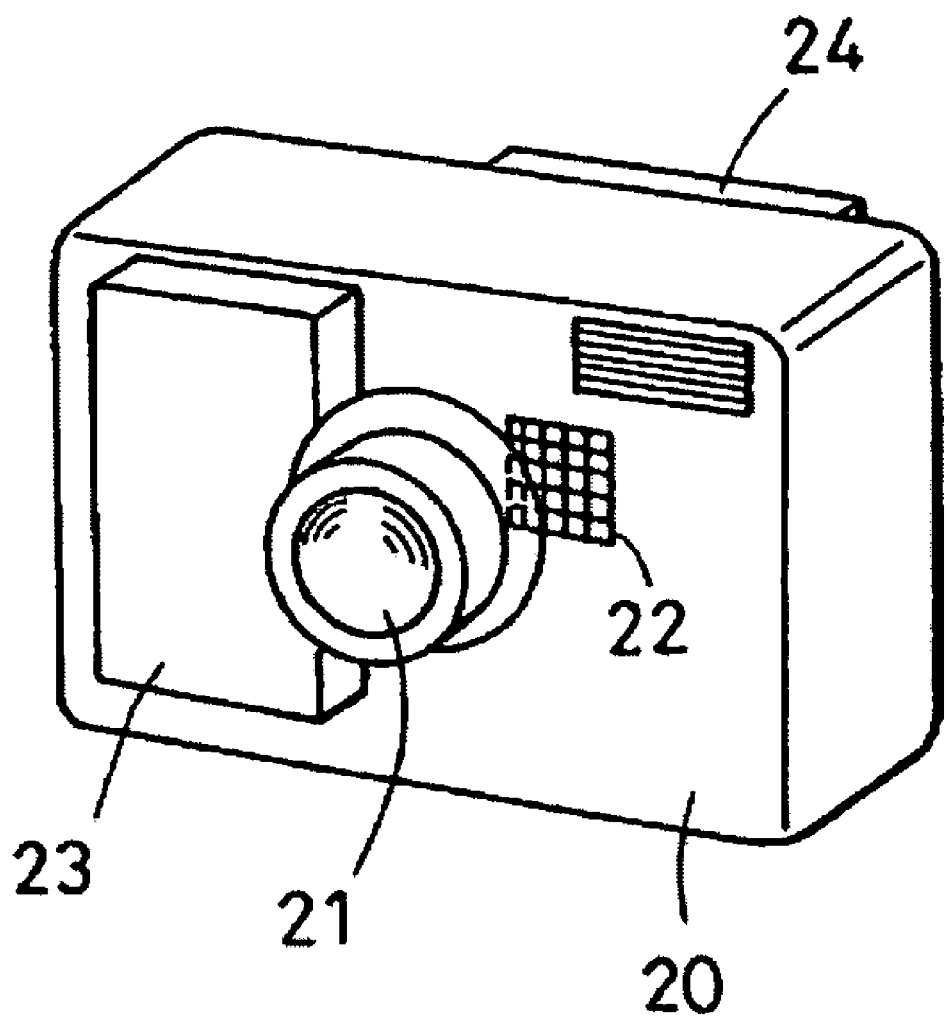
FIG. 15 is a perspective overview of a digital still camera to which the optical system shown in FIG. 1 or 11 is applied.

A description will now be given of a digital still camera that uses a zoom lens (or zoom lens system) shown in the first and second embodiments for an image-taking optical system, with reference to FIG. 15. In FIG. 15, 20 denotes a camera body. 21 denotes an image-taking optical system that includes a zoom lens described with reference to FIG. 1. 22 dentoes a CCD sensor, a CMOS sensor or another photoelectric conversion element. 23 denotes a memory that records information corresponding to a subject image that is photoelectrically converted by the sensor 22. 24 denotes a finder, such as a LCD panel, for observing the subject image formed on the sensor 22.

Thus, an application of the inventive zoom lens to an image-taking apparatus, such as a digital still camera, would realize a small image-taking apparatus having high optical performance.

As described above, the above embodiments can provide a zoom lens system that increases the zooming ratio while maintaining the aberrational low, and an image-taking apparatus having the same.

Further, the present invention is not limited to these preferred embodiments, and various variations and modifications may be made without departing the scope of the present invention.

This application claims a benefit of foreign priority based on Japanese Patent Applications No. 2004-224744, filed on Jul. 30, 2004 and No. 2005-210377, filed on Jul. 20, 2005 which is hereby incorporated by reference herein in its entirety as if fully set forth herein.

What is claimed is:

1. A zoom lens system comprising plural optical units each of which includes plural optical elements each having a rotationally asymmetrical surface, said zoom lens system changing optical power as the optical elements in each of the plural optical units move in directions different from an optical axis,
   wherein a principal point position moves in an optical-axis direction without causing the optical element to move in the optical-axis direction, the zoom lens system having such a shape that the principal point position of at least one unit of the plural optical units is located outside the one unit.

2. A zoom lens system according to claim 1, wherein e and e' are substantially the same in at least one focal length between a wide-angle end and a telephoto end, where H1 and H1' are front and back principal point positions respectively in a first unit in the plural optical units, H2 and H2' are front and back principal point positions respectively in a second unit in the plural optical units, $e_0$ is a distance between an object point and H1, e is a distance between H1' and H2, $e_i$ is a distance between H2' and an image point, and e' is a smaller one of $e_0$ and $e_i$.

3. A zoom lens system according to claim 2, wherein $0.7 \leq e/e' \leq 1.4$ is met.

4. A zoom lens system according to claim 1, wherein $e_{t1}<e_{w1}$ and $e_{t2}<e_{w2}$ are met, where H1' is a back principal point position in a first unit in the plural optical units, H2 is a front principal point position in a second unit in the plural optical units, $e_{t1}$ is a distance between H1' and H2 when the first unit has a positive power and an entire system has a minimum power, $e_{w1}$ is a distance between H1' and H2 when the first unit has a positive power and an entire system has a maximum power, $e_{t2}$ is a distance between H1' and H2 when the first unit has a negative power and an entire system has a minimum power, $e_{w2}$ is a distance between H1' and H2 when the first unit has a negative power and an entire system has a maximum power.

5. A zoom lens system according to claim 1, wherein said zoom lens system forms an image on a photoelectric conversion element.

6. An image-taking apparatus comprising:
   a zoom lens system according to claim 1; and
   a photoelectric conversion element for receiving an image formed by the zoom lens system.

* * * * *